United States Patent
Voves

(10) Patent No.: US 7,883,318 B2
(45) Date of Patent: Feb. 8, 2011

(54) SELF-ORIENTING, LINEAR DRIVE APPARATUS FOR HARVESTING POWER FROM THE WIND

(76) Inventor: Joseph Voves, 18 Helena Dr., Chappaqua, NY (US) 10514

( * ) Notice: Subject to any disclaimer, the term of this patent is extended or adjusted under 35 U.S.C. 154(b) by 846 days.

(21) Appl. No.: 11/893,286

(22) Filed: Aug. 15, 2007

(65) Prior Publication Data
US 2008/0247871 A1 Oct. 9, 2008

(51) Int. Cl.
*F03D 3/02* (2006.01)

(52) U.S. Cl. ............... 416/7; 416/9; 415/4.2; 415/4.4; 415/5; 415/907

(58) Field of Classification Search ........... 415/4.2, 415/4.4, 5, 208.1, 907; 416/7, 9; 290/43, 290/44, 54, 55
See application file for complete search history.

(56) References Cited

U.S. PATENT DOCUMENTS

| | | | |
|---|---|---|---|
| 402,055 A * | 4/1889 | Besemer | 415/5 |
| 1,568,718 A * | 1/1926 | Brattland | 415/4.1 |
| 3,928,771 A * | 12/1975 | Straumsnes | 290/43 |
| 4,012,163 A | 3/1977 | Baumgartner et al. | |
| 4,039,849 A | 8/1977 | Mater et al. | |
| 4,074,951 A | 2/1978 | Hudson | |
| 4,084,918 A | 4/1978 | Pavlecka | |
| 4,113,408 A | 9/1978 | Wurtz et al. | |
| 4,134,469 A | 1/1979 | Davis | |
| 4,186,314 A | 1/1980 | Diggs | |
| 4,288,200 A | 9/1981 | O'Hare | |
| 4,494,008 A | 1/1985 | Patton | |
| 4,684,817 A | 8/1987 | Goldwater | |
| 5,997,252 A | 12/1999 | Miller | |
| 6,191,496 B1 | 2/2001 | Elder | |
| 6,242,818 B1 | 6/2001 | Smedley | |
| 6,800,956 B2 | 10/2004 | Bartlett | |
| 6,857,846 B2 | 2/2005 | Miller | |
| 2003/0001393 A1 | 1/2003 | Staikos et al. | |

* cited by examiner

*Primary Examiner*—Ninh H Nguyen
(74) *Attorney, Agent, or Firm*—Karl F. Milde, Jr.; Eckert Seamans; Cherin & Mellott, LLC

(57) ABSTRACT

Apparatus for harvesting power from the wind, mounted on a vertical support or pole, has two linear "power harvesting devices" arranged in V-shaped configuration with the apex of the "V" mounted for rotation in a horizontal plane about the vertical support. The two power harvesting devices move under the influence of incoming wind to orient themselves such that the apex of its "V"-shape structure always faces the incoming wind. The power harvesting devices are each provided with blades attached for movement with a linear endless drive conveyor. With the apex of the "V" facing the wind, the blades are oriented to intercept this wind and to cause movement of the conveyor drive to which they are attached.

4 Claims, 4 Drawing Sheets

SELF-ORIENTING, LINEAR DRIVE APPARATUS FOR HARVESTING POWER FROM THE WIND

BACKGROUND OF THE INVENTION

The present invention relates to apparatus for harvesting and converting power from the wind into another form of power, particularly electrical power.

Many types of apparatus have been devised to convert wind power into useable mechanical or electrical power. From the classic old windmills of Europe used to mill grain, to the much smaller farm windmills of nineteenth century United States used to pump water, to the modern-day, propeller-driven systems used to generate electricity, such apparatus has conventionally utilized an array of wind-intercepting blades arranged symmetrically about and connected to a substantially horizontal, rotatable drive shaft. Means, such as a tail fin, have normally been provided to orient the axis of the drive shaft so that the blades would continuously face the wind.

The U.S. Pat. No. 6,800,956 discloses a currently conventional system with this type of structure for generating electrical power.

In an attempt to reduce the cost and/or increase the power output or efficiency, numerous alternative structures have also been devised to convert wind power into electrical power. Examples of such devices may be found in the following U.S. patents:

U.S. Pat. Nos. 4,012,163; 4,039,849; 4,074,951; 4,084,918; 4,113,408; 4,288,200; 4,684,817; 5,997,252; 6,191,496; 6,242,818 and 6,857,846.

These devices are limited in their ability to harvest wind power by their relatively limited profile that intercepts the wind. To harvest additional power, it is necessary to enlarge the size of these devices and/or to place multiple devices in the path of the wind.

The U.S. Pat. No. 4,186,314 discloses what is termed a "high efficiency" wind power machine having a large wind-intercepting profile. This is achieved by attaching blades to a conveyer-like structure that moves the blades linearly, in a vertical direction, perpendicular to the horizontal path of the wind. This structure is designed in modular fashion so that multiple modules may be arranged in adjacent relationship, thereby increasing the wind-intercepting profile to almost any desired cross-sectional area. By assembling the modules as building blocks in a V-shaped array, and rotatably mounting the array about a vertical axis, the structure becomes self-orienting to face in the direction of the incoming wind.

As noted above, the wind-intercepting blades of this known device travel linearly and vertically when moved by the wind. The U.S. Patent Publication No. US2003/0001393 discloses a similar conveyor-type, wind-driven power-generating device in which a plurality of "sails" are caused to move linearly in the horizontal direction. Efficiency is said to be increased by the particular design of the sails that respond to the force of the wind, both when upwind and downwind, as they traverse the conveyor path.

SUMMARY OF THE INVENTION

It is a principal object of the present invention to provide apparatus for converting wind power into electrical power in a highly efficient matter.

It is a further object of the present invention to provide a wind-driven electrical power generator which has a large, wind-intercepting profile.

It is a further object of the present invention to provide apparatus for harvesting power from the wind which self-orients itself to face the wind.

These objects, as well as other objects that will become apparent from the discussion that follows, are achieved, in accordance with the present invention, by providing apparatus of the type described above having a vertical support and two linear "power harvesting devices" arranged in V-shaped configuration with the apex of the "V" mounted for rotation in a horizontal plane about the vertical support or pole.

With this configuration, the two power harvesting devices move under the influence of incoming wind to orient themselves such that the apex of its "V"-shaped structure always faces the incoming wind.

The power harvesting devices are each provided with blades attached for movement with a linear endless drive conveyor. When the apex of the "V" structure faces the wind, the blades are oriented to intercept this wind and to cause movement of the conveyor drive to which they are attached. The conveyor, in turn, may be mechanically coupled to an electric generator for converting the mechanical power to electrical power.

More specifically, the apparatus according to the invention includes the following structural elements:
(a) a substantially vertical support, such as a pole;
(b) a first power harvesting device including:
  (1) an upper elongate horizontal support having a first end and a second end;
  (2) a lower elongate horizontal support having a first end and a second end, the lower support being arranged below the upper support in vertical alignment therewith;
  (3) a first axle mounted substantially vertically between the first end of the upper support and the first end of the lower support;
  (4) a second axle mounted substantially vertically between the second end of the upper support and the second end of the lower support;
  (5) a first pair of wheels mounted for rotation in vertically spaced apart relationship on the first axle;
  (6) a second pair of wheels mounted for rotation in vertically spaced apart relationship on the second axle;
  (7) a first endless drive mounted for movement about the first pair of wheels and about the second pair of wheels; and
  (8) a first plurality of blades, attached to the first endless drive for intercepting the wind; and
(c) a second power harvesting device, substantially identical to the first power harvesting device, wherein the first ends of the upper and lower supports of the first power harvesting device and the first ends of the upper and lower supports of the second power harvesting device are coupled together such that the upper and lower supports of the first power harvesting device extend at an angle with respect the upper and lower supports of the second power harvesting device, thereby forming a combined power harvesting device with a substantially horizontal "V" shaped structure. This structure is mounted for rotational movement in a horizontal plane about the vertical support.

With this arrangement the first and second power harvesting devices are therefore operative to move under the influence of incoming wind to orient themselves with the apex of their "V" shaped structure facing the incoming wind. Once oriented, the blades of these power harvesting devices intercept the incoming wind and cause movement of the endless conveyor drives to which they are attached.

In a preferred embodiment the power harvesting devices are connected at an angle of 90° with respect to each other, so that they each face the wind at an angle of 45°.

In a further preferred embodiment of the invention an air deflector at the center of the apex of the V-shaped structure is proved to prevent the wind from entering the space adjacent the inner end of each endless conveyor drive and thereby applying a force to the blades in a direction counter to the desired direction of movement of these drives.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
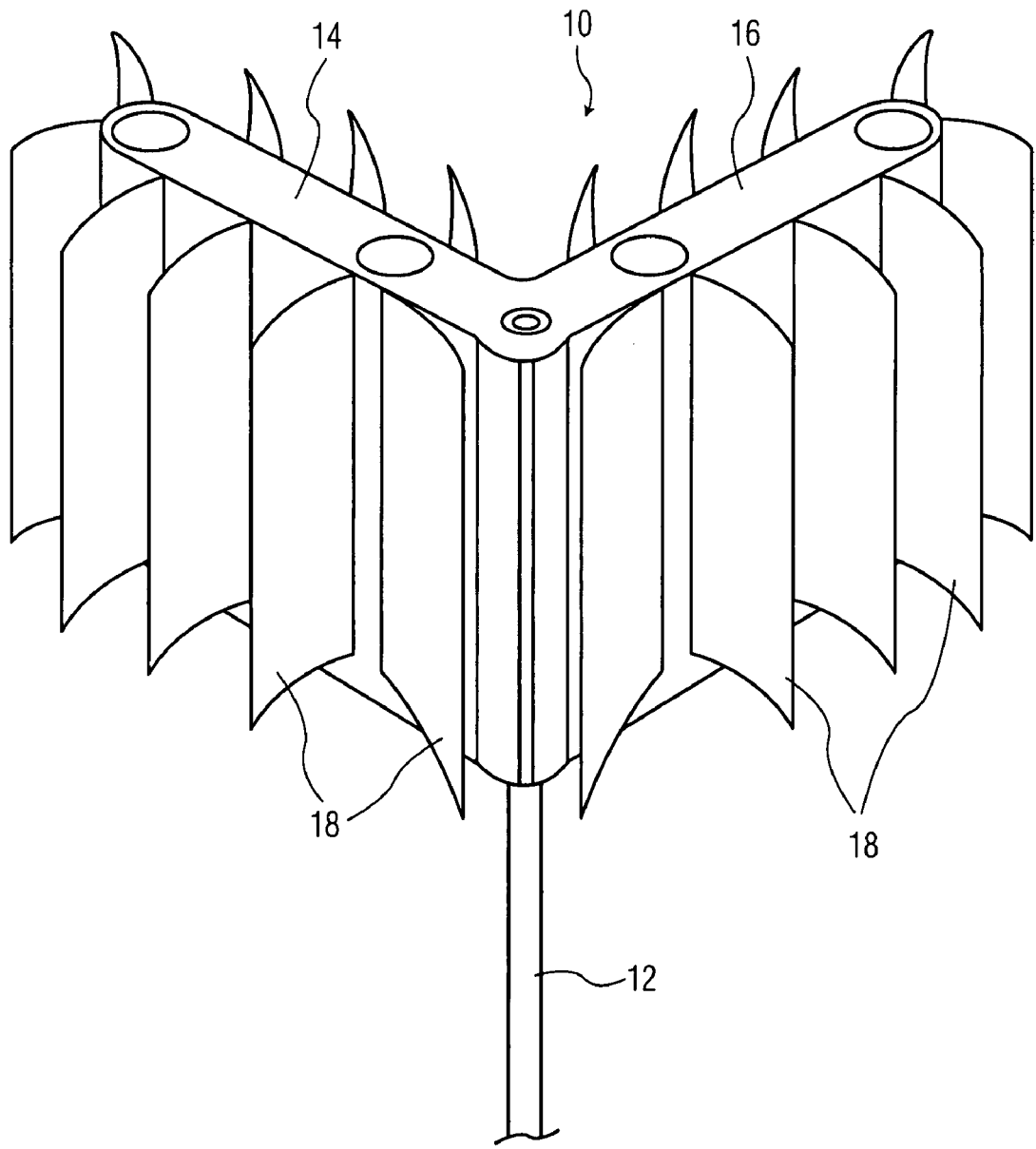
FIG. 1 is a perspective view of the wind power harvesting apparatus according to the preferred embodiment of the present invention.

The preferred embodiments of the present invention will now be described with reference to FIGS. 1-4 of the drawings. Identical elements in the various figures are designated with the same reference numerals.

Figure 2:
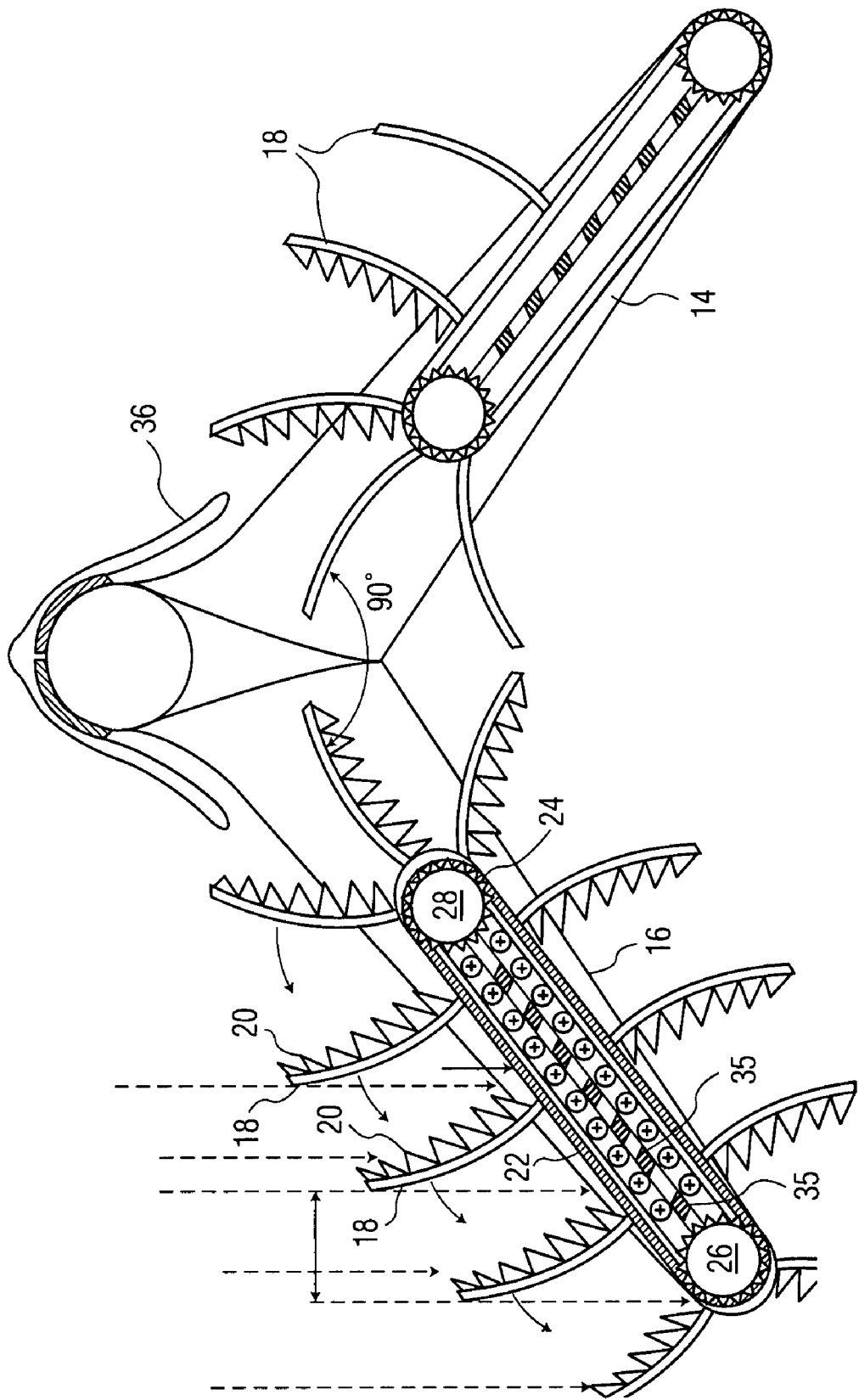
FIG. 2 is a top view of the wind power harvesting apparatus of FIG. 1.
Figure 3:
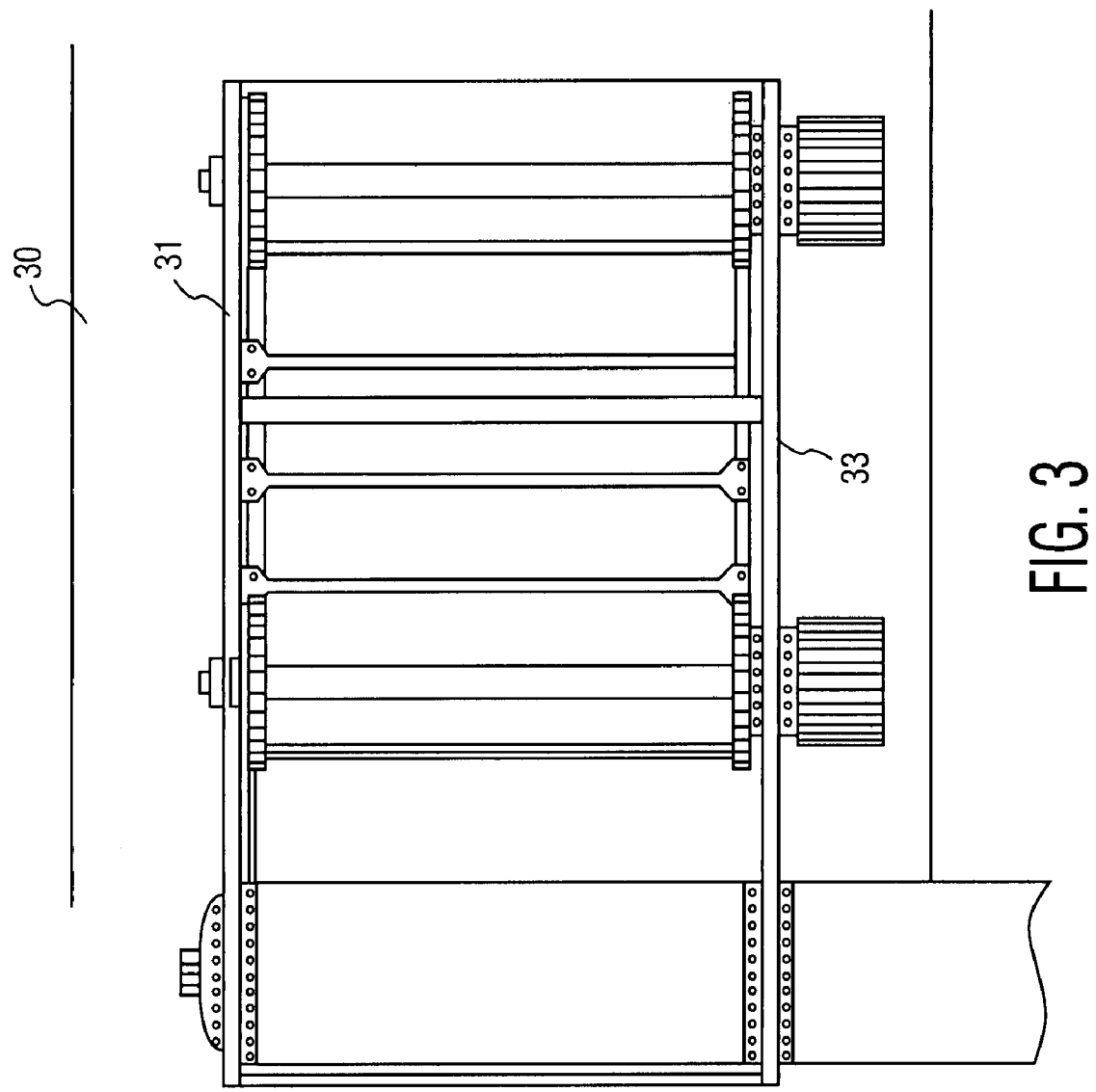
FIG. 3 is partial side view, with the blades removed, of the wind power harvesting apparatus of FIG. 1.

As shown in FIG. 1-3, the wind power harvesting apparatus 10 comprises a "V"-shaped structure mounted with two sets of heavy-duty bearings 11, 13 on a vertical pole 12 in such a way as to rotate freely in the horizontal plane. Like a weathervane, it orients and adjusts itself so that the apex of the "V" is always caused to face directly into the wind.

The V-shaped structure is formed of two "power harvesting" devices 14 and 16, each of which carries a plurality of blades 18 arranged to move in response to the force of the wind. As shown particularly in FIGS. 2 and 3, the blades 18 are moved by the wind along a linear path prescribed by a "conveyor" 22 which wraps around and rotates sprockets or wheels 24 at opposite ends of the path. The conveyor may be constructed of chain links, as shown, or may be formed of a continuous strip of material (metal, rubber or plastic). The conveyor sprockets or wheels, in turn, drive one or more electric generators 26, 28. As shown in FIG. 3, shafts 32, 34, supporting the sprockets 24 are set in pairs of bearings 25, minimizing friction.

Figure 4:
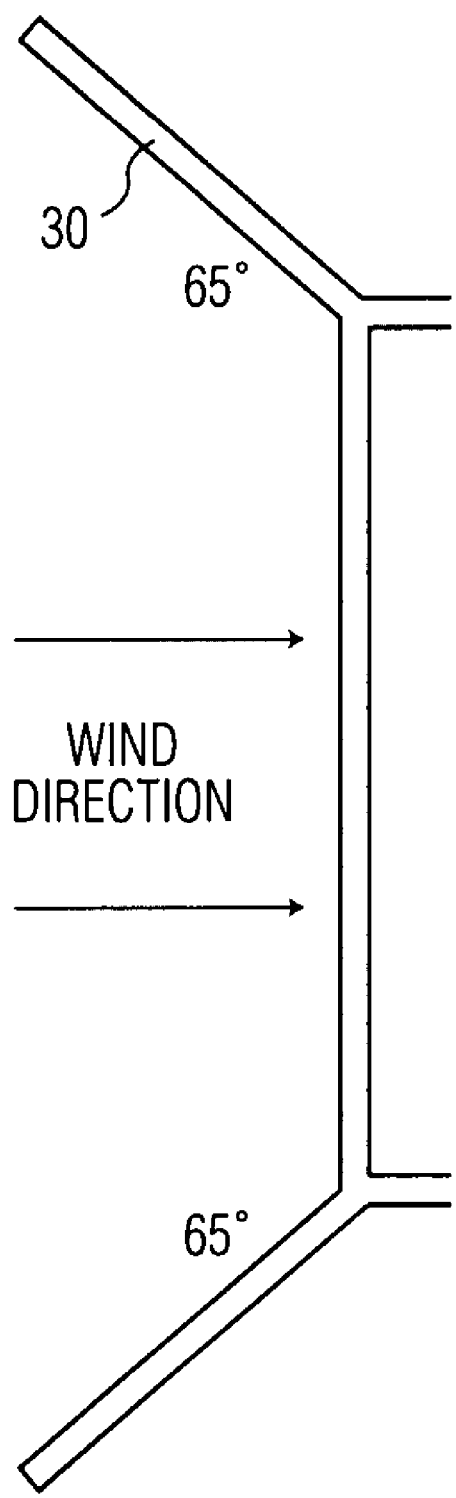
FIG. 4 is an end view of a wind deflector which may be used with the wind power harvesting apparatus of the present invention.

If desired, a "flair deflector" 30 shown in FIGS. 3 and 4 (but not in FIGS. 1 and 2) may be attached to each power harvesting device 14, 16 to increase the width of the apparatus and intercept a greater quantity of wind.

The dimensions of the wind power harvesting devices 14 and 16 (length and width) are a matter of design choice.

The blades preferably have "saw tooth" forward surfaces 20 which enable them to capture and harvest the maximum amount of power from the wind.

The devices 14, 16 are preferably disposed at 90 degrees with respect to each other, enabling them to capture the maximum force of the wind at an optimum 45 degrees with respect to the wind direction on each side of the pole 12.

Top and bottom elongate supports 31, 33 are joined by the main pole 12, the sprocket shafts 32, 34 and by reinforcements/deflectors 35. As shown in FIG. 2 these deflectors 35 in the middle of each conveyor allow the wind to pass through the conveyor and to be deflected by the blades on the opposite (rear) side of the apparatus. This causes the wind to apply a force the blades on the return direction of the conveyor.

A air deflector 36 on the center of the apex of the V-shaped apparatus prevents the wind from entering the space adjacent the inner end of each conveyor 22 and thereby applying a force to the blades in a direction counter to the desired direction of movement of the conveyer.

The present invention allows a much a higher percentage of the power of the wind to be converted to electrical power, as compared to propeller-driven electrical generators, since the apparatus intercepts a large cross-section of the incoming wind.

There has thus been shown and described a novel apparatus for harvesting power from the wind which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for harvesting power from the wind, said apparatus comprising, in combination:
   (a) A substantially vertical support;
   (b) a first power harvesting device including:
      (1) an upper elongate horizontal support having a first end and a second end;
      (2) a lower elongate horizontal support having a first end and a second end, said lower support being arranged below said upper support in vertical alignment therewith;
      (3) a first axle mounted substantially vertically between said first end of said upper support and said first end of said lower support;
      (4) a second axle mounted substantially vertically between said second end of said upper support and said second end of said lower support;
      (5) a first pair of wheels mounted for rotation in vertically spaced apart relationship on said first axle;
      (6) a second pair of wheels mounted for rotation in vertically spaced apart relationship on said second axle;
      (7) a first endless drive mounted for movement about said first pair of wheels and about said second pair of wheels;
      (8) a first plurality of blades, attached to said first endless drive for intercepting the wind; and
      (9) a reinforcing deflector panel extending between said upper and lower horizontal support, said deflector panel having openings therethrough which allow the wind to pass through from one side thereof to the other; and
   (c) a second power harvesting device including:
      (1) an upper elongate horizontal support having a first end and a second end;

(2) a lower elongate horizontal support having a first end and a second end, said lower support being arranged below said upper support in vertical alignment therewith;

(3) a third axle mounted substantially vertically between said first end of said upper support and said first end of said lower support;

(4) a fourth axle mounted substantially vertically between said second end of said upper support and said second end of said lower support;

(5) a third pair of wheels mounted for rotation in vertically spaced apart relationship on said third axle;

(6) a fourth pair of wheels mounted for rotation in vertically spaced apart relationship on said fourth axle;

(7) a second endless drive mounted for movement about said third pair of wheels and about said fourth pair of wheels;

(8) a second plurality of blades, attached to said second endless drive for intercepting the wind; and (9) a reinforcing deflector panel extending between said upper and lower horizontal support, said deflector panel having openings therethrough which allow the wind to pass through from one side thereof to the other;

wherein said first ends of said upper and lower supports of said first power harvesting device are mounted for rotational movement in a horizontal plane about said vertical support, wherein said first ends of said upper and lower supports of said second power harvesting device are mounted for rotational movement in a horizontal plane about said vertical support, and wherein said first ends of the upper and lower supports of said first power harvesting device and said first ends of the upper and lower supports of said second power harvesting device are coupled together such that said upper and lower supports of said first power harvesting device extend at an angle with respect the upper and lower supports of said second power harvesting device, thereby forming a combined power harvesting device with a substantially horizontal "V" shape that is mounted for rotational movement in a horizontal plane about said vertical support, the combined power harvesting device being operative to move under the influence of incoming wind to orient itself with the apex of its "V" shape facing the incoming wind, and the first and second blades of the first and second power harvesting devices, respectively, being oriented to intercept the incoming wind and cause movement of the first and second endless drives, respectively, to which said blades are attached; and wherein the openings in the reinforcing deflector panel of each of the first and second power harvesting devices allow the incoming wind that impinges on the blades on one side thereof to pass through and impinge on the blades on the opposite side.

2. The apparatus defined in claim 1, wherein said angle is approximately 90 degrees.

3. The apparatus defined in claim 1, further comprising an air deflector mounted at the center of the apex of the V-shaped structure for preventing the wind from entering the space adjacent the inner end of each endless drive and thereby applying a force to the blades in a direction counter to the desired direction of movement of the endless drives.

4. The apparatus defined in claim 1, further comprising an air deflector disposed on and extending outward from at least one of the upper and lower support of each of the first and second power harvesting device, to deflect the wind toward the blades of the respective power harvesting device.

* * * * *